US011546232B1

(12) United States Patent
Maeda et al.

(10) Patent No.: US 11,546,232 B1
(45) Date of Patent: Jan. 3, 2023

(54) VIDEO ANALYSIS AND DATA DELIVERY METHOD

(71) Applicant: Hitachi, Ltd., Tokyo (JP)

(72) Inventors: Daisuke Maeda, Mountain View, CA (US); Sudhanshu Gaur, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/586,113

(22) Filed: Jan. 27, 2022

(51) Int. Cl.
*G06F 15/173* (2006.01)
*H04L 41/5009* (2022.01)
*H04L 43/16* (2022.01)
*H04L 43/0817* (2022.01)
*H04L 41/0604* (2022.01)
*H04L 43/0894* (2022.01)

(52) U.S. Cl.
CPC ...... *H04L 41/5009* (2013.01); *H04L 41/0604* (2013.01); *H04L 43/0817* (2013.01); *H04L 43/0894* (2013.01); *H04L 43/16* (2013.01)

(58) Field of Classification Search
CPC ............. H04L 41/5009; H04L 41/0604; H04L 43/0817
USPC ................................. 709/203, 224
See application file for complete search history.

(56) References Cited

U.S. PATENT DOCUMENTS

| 2010/0333116 A1* | 12/2010 | Prahlad | G06F 16/1844 |
| | | | 713/153 |
| 2013/0166711 A1* | 6/2013 | Wang | G08B 13/19656 |
| | | | 709/223 |
| 2013/0182700 A1* | 7/2013 | Figura | H04L 43/04 |
| | | | 709/224 |
| 2017/0078626 A1* | 3/2017 | Chowdhery | H04N 7/188 |
| 2020/0097903 A1* | 3/2020 | Jung | H04N 5/913 |
| 2021/0105191 A1* | 4/2021 | Yang | H04L 67/101 |
| 2021/0152998 A1* | 5/2021 | Parvataneni | H04L 47/2475 |

* cited by examiner

*Primary Examiner* — Duyen M Doan
(74) *Attorney, Agent, or Firm* — Procopio, Cory, Hargreaves & Savitch LLP

(57) ABSTRACT

A method for providing data to a client computing device from an edge computing device is discussed herein. The method may include performing a network proximity check regarding the client computing device associated with a request for data captured by the wideband sensor. The method may further include determining, based on at least one proximity metric associated with the client computing device, a route for data responsive to the request for data associated with the network proximity check, where the route is one of a route including the cloud storage or a route that does not include the cloud storage. The method may also include receiving the request for data captured by the wideband sensor associated with the network proximity check. The method may also include transmitting the data responsive to the request for data captured by the wideband sensor associated with the network proximity check to the client computing device through the determined route.

18 Claims, 13 Drawing Sheets

| Event type | Analysis results | Timestamp | Corresponding URL on edge | Corresponding URL on cloud |
|---|---|---|---|---|
| Cycle time | 10 minutes | 113020211215 | 121.amp?1215-1225 | |
| Cycle time | 5 minutes | 113020211227 | 121.amp?1227-1232 | |
| Cycle time | 4 minutes | 113020211232 | 121.amp?1232-1236 | |

FIG. 7

| Work shift | Production type | Yield | Timestamp |
|---|---|---|---|
| Shift A | PCB version A | 99.5% | 113020211200 |
| Shift B | PCB version A | 80.0% | 113020211810 |

FIG. 8

| Event type | Analysis results | Timestamp | Corresponding URL on edge | Corresponding URL on cloud |
|---|---|---|---|---|
| Cycle time | 10 minutes | 113020211215 | 121.amp?1215-1225 | c910.amp?1215-1225 |
| Cycle time | 5 minutes | 113020211227 | 121.amp?1227-1232 | |
| Cycle time | 4 minutes | 113020211232 | 121.amp?1232-1236 | |

FIG. 9

VIDEO ANALYSIS AND DATA DELIVERY METHOD

BACKGROUND

Field

The present disclosure is generally directed to minimizing wideband sensor data transfer over a network for monitoring or analysis.

Related Art

In some aspects of industrial process analysis manual investigation on raw data is still required even with the state-of-the-art video analytics technologies to understand the root cause of inefficiencies (e.g., lower than expected productivity). Therefore, there is a demand to store raw data on cloud resources or network-connected storages so that people can download or stream it for eyeballing from anywhere including outside the factory where a target process is located. Here "raw data" refers to data that human can see it as a three-dimensional (3D) or two-dimensional (2D) video in this invention disclosure.

On the other hand, storing and transferring raw data on cloud resources or network-connected storage, can be costly because it requires a considerable network capacity (i.e. bandwidth) and a cost charged based on the amount of data transferred to cloud resources.

In some systems including edge computers and a controller, the controller receives all analysis results from all the edge computers and decides which edge computer's video should be uploaded to a cloud resource, according to the importance of the analysis result. This system configuration can reduce the amount of data uploaded to the cloud resources and therefore realize a bandwidth-efficient video surveillance system. However, such systems may not solve the issue relating to the capacity of the network. For example, Ultra High-Definition video can be 100 Mbps or more and therefore accommodating multiple channels of such the high-throughput video on cloud resource over the internet would raise a serious concern regarding associated costs.

SUMMARY

Example implementations described herein include an innovative method for providing data to a client computing device from an edge computing device of a system including the edge computing device communicatively coupled with a local storage, a wideband sensor, the client computing device, and a cloud storage. The method may include performing a network proximity check regarding the client computing device associated with a request for data captured by the wideband sensor. The method may further include determining, based on at least one proximity metric associated with the client computing device, a route for data responsive to the request for data associated with the network proximity check, where the route is one of a route including the cloud storage or a route that does not include the cloud storage. The method may also include receiving the request for data captured by the wideband sensor associated with the network proximity check. The method may also include transmitting the data responsive to the request for data captured by the wideband sensor associated with the network proximity check to the client computing device through the determined route.

Example implementations described herein include an innovative computer-readable medium storing computer executable code for providing data to a client computing device from an edge computing device of a system including the edge computing device communicatively coupled with a local storage, a wideband sensor, the client computing device, and a cloud storage. The code when executed by a processor may cause the processor to perform a network proximity check regarding the client computing device associated with a request for data captured by the wideband sensor. The code when executed by the processor may cause the processor to determine, based on at least one proximity metric associated with the client computing device, a route for data responsive to the request for data associated with the network proximity check, where the route is one of a route including the cloud storage or a route that does not include the cloud storage. The code when executed by the processor may cause the processor to receive the request for data captured by the wideband sensor associated with the network proximity check and transmit the data responsive to the request for data captured by the wideband sensor associated with the network proximity check to the client computing device through the determined route.

Example implementations described herein include an innovative system for providing data to a client computing device from an edge computing device of a system including the edge computing device communicatively coupled with a local storage, a wideband sensor, the client computing device, and a cloud storage. The system may include means for performing a network proximity check regarding the client computing device associated with a request for data captured by the wideband sensor. The system may include means for determining, based on at least one proximity metric associated with the client computing device, a route for data responsive to the request for data associated with the network proximity check, where the route is one of a route including the cloud storage or a route that does not include the cloud storage. The system may include means for receiving the request for data captured by the wideband sensor associated with the network proximity check and means for transmitting the data responsive to the request for data captured by the wideband sensor associated with the network proximity check to the client computing device through the determined route.

BRIEF DESCRIPTION OF DRAWINGS

FIG. 7 shows an example of sets of data stored in the storage for analysis result.

FIG. 8 illustrates an example of factory production data.

FIG. 9 illustrates a set of data stored in the storage for analysis result after adding the cloud-based URL.

DETAILED DESCRIPTION

Figure 1:
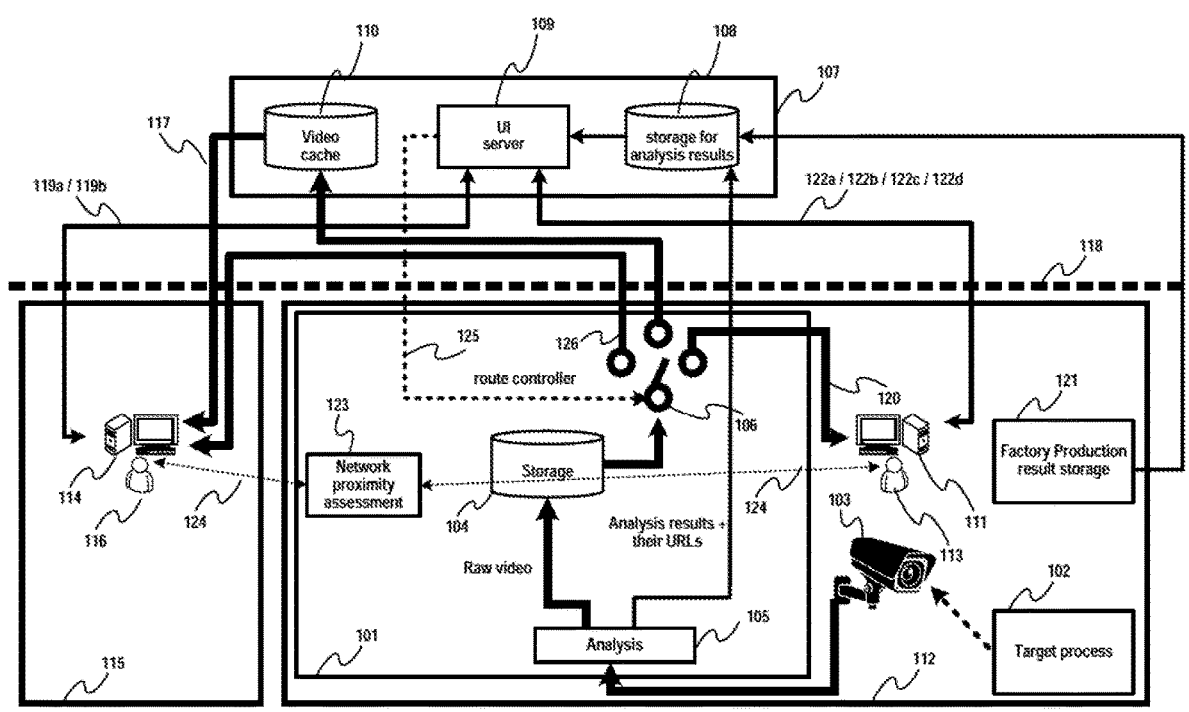
FIG. 1 shows an example of the architecture of a data analysis system, in accordance with aspects of the invention.

The following detailed description provides details of the FIGs. and example implementations of the present application. Reference numerals and descriptions of redundant elements between FIGs. are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein relate to an innovative method for providing data to a client computing device from an edge computing device of a system including the edge computing device communicatively coupled with a local storage, a wideband sensor, the client computing device, and a cloud storage. The method includes receiving, from the client computing device, a network proximity check associated with a request for data captured by the wideband sensor. The method also includes determining, based on at least one proximity metric associated with the client computing device, a destination for data responsive to the request for data associated with the network proximity check, where the destination is determined to be one of the cloud storage or the client computing device. The method further includes receiving the request for data captured by the wideband sensor associated with the network proximity check and transmitting data responsive to the request for data captured by the wideband sensor associated with the network proximity check to the determined destination.

In some aspects, the innovative method may be performed as part of a data analysis system to improve the efficiency of a factory as disclosed in this description. FIG. 1 shows an example of the architecture of a data analysis system, in accordance with aspects of the invention. The system includes an edge computer 101 that belongs to a network 112, a target process 102, a wideband sensor (e.g., a camera 103, a light detection and ranging (LiDAR) sensor, microphone, vibration sensor, etc.) that belongs to the network 112, a storage 104, a signal analysis component 105, a data transfer capability 106, a set of cloud computing resources (hereafter "cloud") 107, a storage for analysis results 108 in the cloud 107, a user interface (UI) server 109 in the cloud 107, a video cache 110 in the cloud 107, a client computer 111 that belongs to the network 112, another client computer 114 connected to a different network 115 from the network 112, and internet 118. The client computer 111, in some aspects, is considered to be in a same "network group," while the client computer 114 in the discussion of FIGS. 1-3 may be considered to be in a same network group or a different "network group" according to the proximity between the two networks.

In this invention disclosure, being in a same "network group" may refer to "computing devices that are connected to each other with one or more proximity metrics that meet a set of proximity thresholds and/or criteria." Therefore, the network group may include computing devices in different physical networks as long as the connection meets the proximity criteria. The proximity criteria may include one or more of a maximum latency (or round trip time) of communication between the computing devices, a number of hops (e.g., based on a time to live (TTL) of a transmitted and/or received packet) between the computing devices, a bandwidth available for communication between the devices, a security protocol associated with the communication between the computing devices, and so on. The computing devices, in some aspects, may be in a same, or a different, virtual network or may use a secure tunnel for communication.

Figure 2:
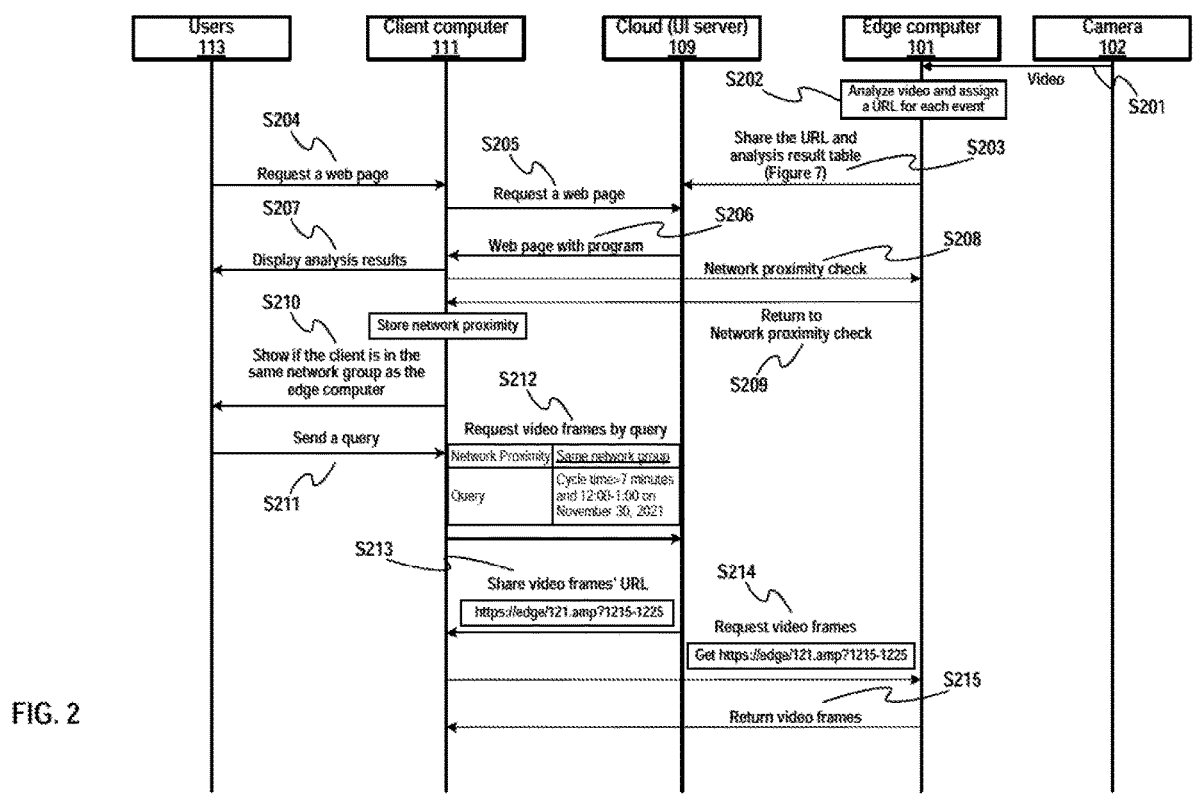
FIG. 2 is a call flow diagram illustrating the method for providing data to a client computing device from an edge computing device in a same network group, in accordance with aspects of the invention.
Figure 3:
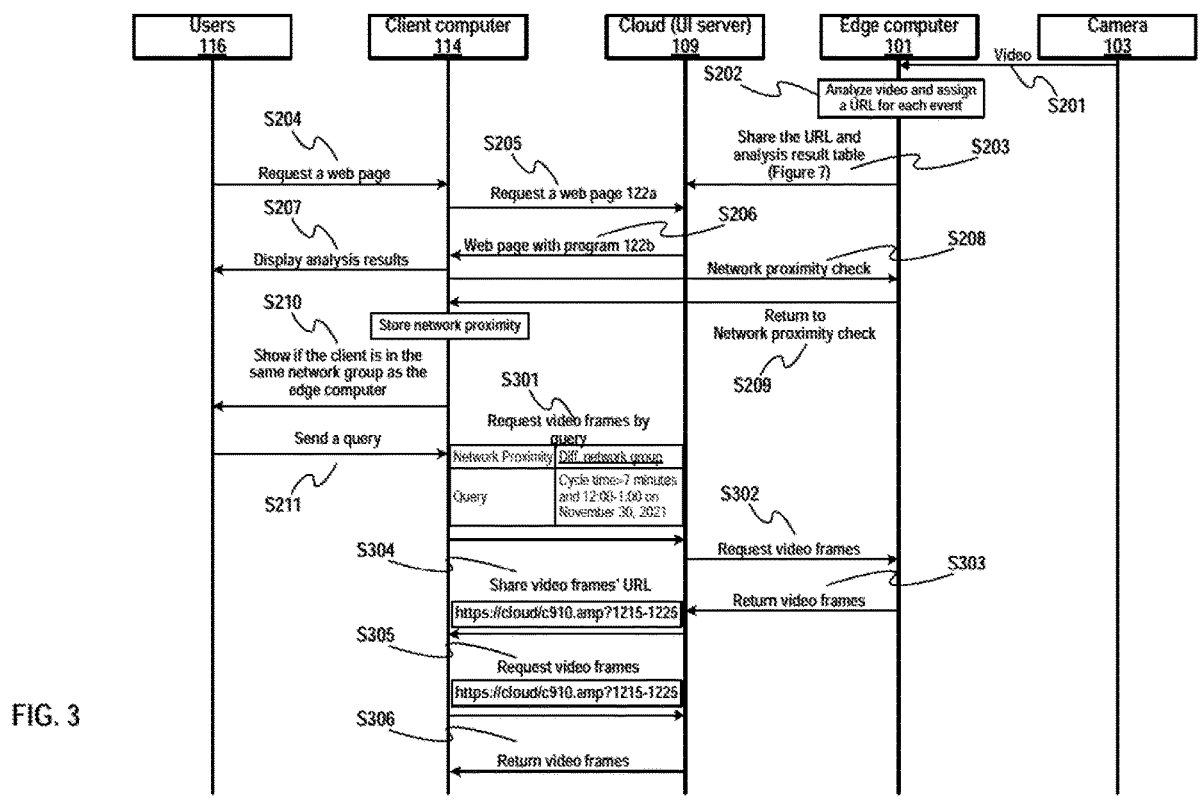
FIG. 3 is a call flow diagram illustrating the method for providing data to a client computing device from an edge computing device that is not in the same network group, in accordance with aspects of the invention.

The flow of the system is explained using FIG. 1, FIG. 2, FIG. 3, and FIG. 4. FIG. 2 is a call flow diagram illustrating the method for providing data to a client computing device from an edge computing device in a same network group, in accordance with aspects of the invention. FIG. 3 is a call flow diagram illustrating the method for providing data to a client computing device from an edge computing device that is not in the same network group, in accordance with aspects of the invention. Elements of FIGS. 2 and 3 with a same numbering indicate an operation and/or step that is performed for both inter- and intra-network group implementations of the invention. The camera 103 (e.g., as an example of a wideband sensor) may record a 2D or 3D video of the target process 102. The video may then be provided to the edge computer 101 at S201. The camera 103 and the edge computer 101, in some aspects are in the same network group. In some aspects, the camera 103 can transmit the video to the edge computer 101 through a route without the use of the internet 118.

The video may be provided to the storage 104 and then accessed by the signal analysis component 105 or may be provided directly to the signal analysis component 105 for analysis before being provided to the storage 104 along with the results of the analysis. The signal analysis component 105 may then, at S202, analyze the video to extract (identify) an event and at least one Key Performance Index (KPI) related to the factory's efficiency. The results of the analysis at S202 may then be provided by the signal analysis component 105 to the storage 104. As an example, we assume that the system extracts time spent to assemble each part. In that case, the signal analysis component 105 may identify the beginning and the ending of each single process as the event in the video, and the time from the beginning to the end will be extracted as a "cycle time," which is an important KPI to assess the efficiency of factories.

Figure 5:
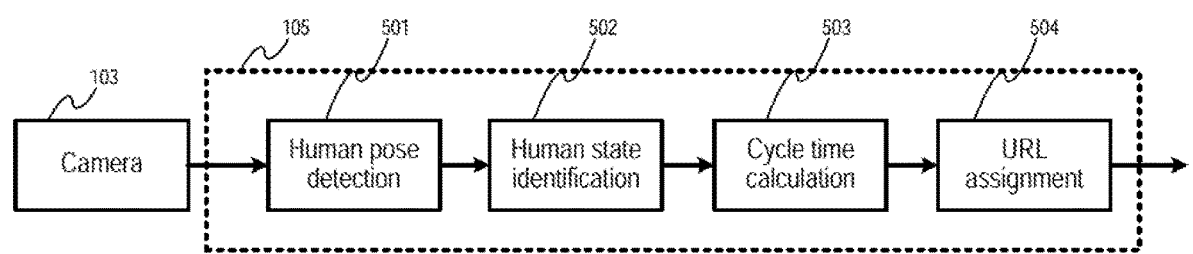
FIG. 5 illustrates an example of an analysis performed by the signal analysis component for cycle time detection, in accordance with aspects of the invention.

FIG. 5 illustrates an example of an analysis performed by the signal analysis component 105 for cycle time detection, in accordance with aspects of the invention. A 2D (or potentially 3D) video is processed at a human pose detection block 501. This block detects people and estimate their pose (for example; standing, bending knees, or stretching an arm). Then the estimated kind of the pose will be further processed at a human state identification block 502, to understand what kind of states they are (for example: idle, picking up an assembly part from a box, inspecting, and inserting the part into a machine). This may help understand the beginning and the ending of a single process that correspond to a cycle time. The output of the human state identification block 502 goes to a cycle time calculation block 503. A Uniform Resource Locator (URL) assignment block 504 assigns a URL to each set of video frames at the storage 104. Here each set of video frames is corresponding to each event detected, namely each cycle time.

Figure 6:
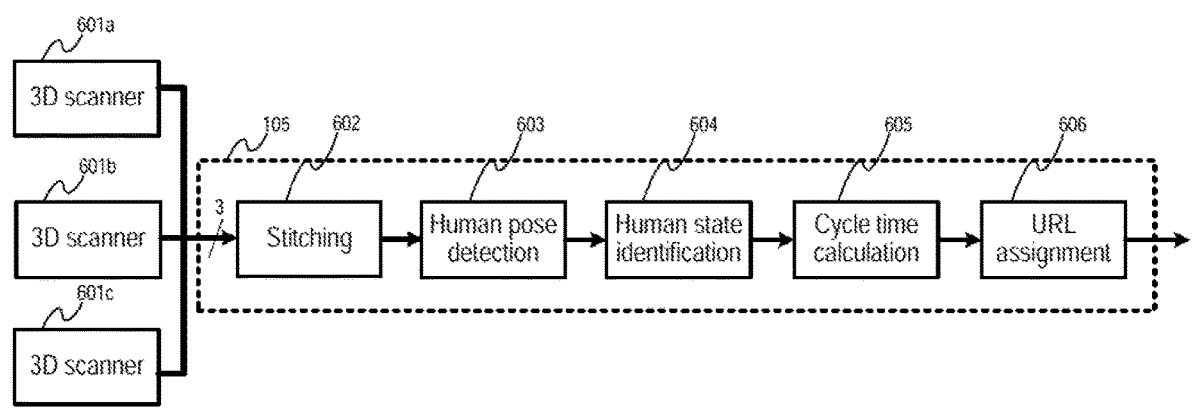
FIG. 6 illustrates another example of an analysis performed by the signal analysis component for cycle time detection that uses 3D scanners such as LiDAR sensors, in accordance with aspects of the invention.

FIG. 6 illustrates another example of an analysis performed by the signal analysis component 105 for cycle time detection that uses 3D scanners such as LiDAR sensors, in accordance with aspects of the invention. 3D videos captured by 3D scanners 601*a*, 601*b*, and 601*c* may be processed at a stitching block 602. In this block, multiple 3D videos will be combined into single 3D video by being aligned with each other. Then the combined 3D video may be processed at a human pose detection block 603. This block detects people and estimates their poses. The estimated pose(s) may be further processed at a human state identification block 604, to understand what kind of states they are. The output of the human state identification block 604 goes to a cycle time calculation block 605. A URL assignment block 606 assigns a URL to each set of video frames at the storage 104. Here each set of 3D video frames is corresponding to each event detected, namely each cycle time.

The raw video, in some aspects, may then be transferred to the storage 104. In addition, a set of a URL of the detected event, the type of the event, the KPI of the event, and the timestamp of the event may be transferred to the cloud 107 through a route over the internet 118 and stored in the storage for analysis result 108 at S203. FIG. 7 shows an example of sets of data stored in the storage for analysis result 108. Note that, at this point, the column of "Corresponding URL on cloud" in FIG. 7 may still be blank. As illustrated, the table in FIG. 7 includes 3 identified events 701-703 (e.g., cycles), a KPI (e.g., cycle time), a timestamp indicating a time associated with the event and a URL for locating the corresponding video data.

Figure 4:
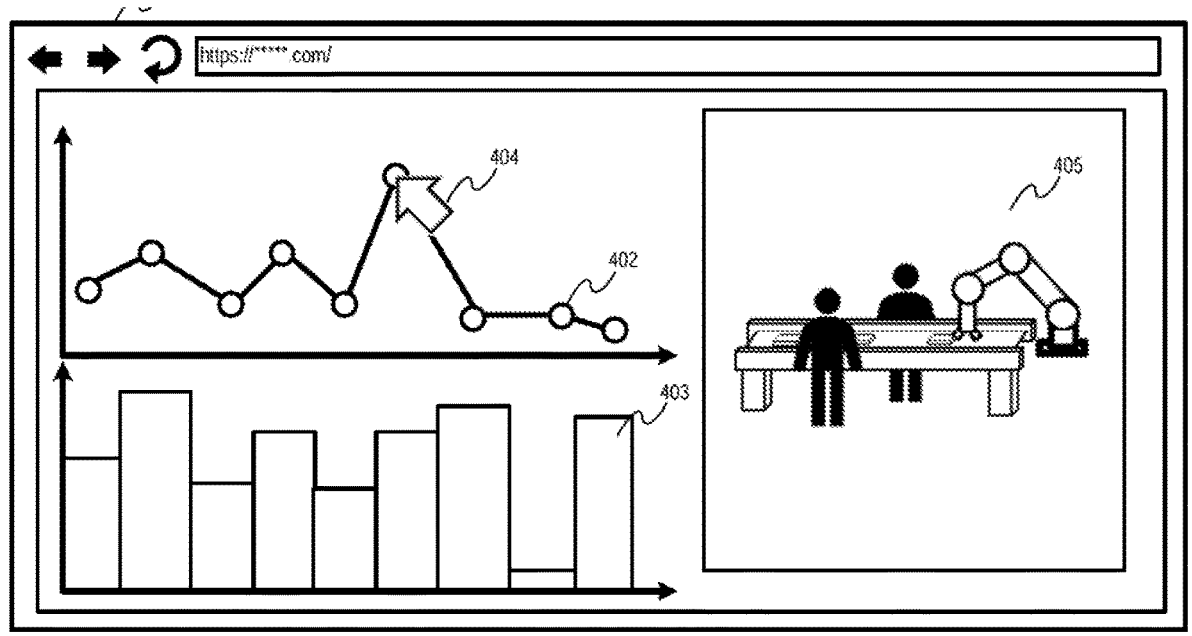
FIG. 4 illustrates an example UI that may be provided to a user in accordance with aspects of the invention.

FIG. 4 illustrates an example UI that may be provided to a user in accordance with aspects of the invention. A UI server 109 may provide a user interface at S206, e.g., a web page 401 of FIG. 4, as a response 122*b* to a request 122*a* at S205 generated by a user 113 via the client computer 111 at S204. When the UI server 109 provides the web page 401 via the response 122*b* to display an analysis result 402 at S207, the response 122*b* includes a microprogram that lets the client computer 111 sends a network proximity check packet 124 to a network proximity assessment block 123 in the edge computer 101 at S208 and receives a reply from the network proximity assessment block 123 at S209, to assess if the client computer 111's network belongs to the same network group as the edge computer 101. The direction of the network proximity check packet 124 and the reply can be reversed. Also, a network proximity check may be initiated by the network proximity assessment block 123 of the edge computer 101 or even the UI server 109. In some aspects, the packet is a simple hyper-text transfer protocol (http) message to check if there is no firewall rule that denies http communications between the client computer 111 and the edge computer 101. The packet may be multiple packets with multiple TTL values so the program can count a number of hops between the edge computer 101 and the client computer 111. The packet may also be a pair of round-trip packets that measures a turn-around-time between the edge computer 101 and the client computer 111. All these messages may be created to check if the two networks belong to the same network 112 (e.g., meet a set of proximity criteria), regardless of network configurations.

If the edge computer 101 and the client computer 111 are in the same network (and in a same network group), the edge computer 101 may be enabled to transfer a video between the edge computer 101 and the client computer 111 via a route that does not include the cloud 107 or the internet 118. Therefore, identifying if the client computer 111 is the same network group as the edge computer 101 is important to reduce the amount data transferred through a route over the internet 118. However, recently, there are many virtual networking technologies such as virtual private network (VPN), Virtual Machine (VM), and Docker containers. Therefore, comparing the IP addresses of two nodes may not provide enough information to determine if they are in a same network group.

As a result, criteria such as "there is a route that is allowed to communicate directly on a specific port," "the number of hops (network boundaries) between two networks is less than a predetermined threshold," and "a latency of packet transmission between two networks is less than a predetermined threshold" are utilized to identify if two nodes are in the same "network group" via the program and the network proximity check packet 124. This brings advantages such as an automatic identification of a network group of clients even when they are connected with a complicated network configuration such as VPN, VM, Docker containers, and/or an adaptation to changes of a network configuration. Especially, if a client is a mobile terminal such as a smartphone that may dynamically utilize multiple mobile networks, the capability of the network proximity assessment block 123 may lead to reduced costs while maintaining the accessibility of videos. The microprogram may then display the result of the assessment, e.g., by showing an icon or a message at S210. The microprogram can be provided to the client computer 111 as a JavaScript program which is embedded in the source code of the web page 401, for example.

The user 113 may then request a set of video frames at S211 (e.g., data captured by the wideband sensor such as the camera 103) that corresponds to the analysis result 402 processed at the signal analysis component 105, by using another user interface 404, such as a cursor or a query such as "Cycle time >7 minutes and 11:00-12:00 on Nov. 30, 2021." The client computer 111 may then send a query (122*c*) to the UI server 109 at S212. The query, in some aspects, may include the result of the network proximity assessment. The UI server 109 may also provide factory production data 403, which is forwarded by a factory production result storage 121 and stored on the storage for analysis result 108. Examples of such the factory production data 403 include PLC (Programmable Logic Controller) data, MES (Manufacturing Execution Systems) data, and OPC (Open Platform Communications) data. By showing the factory production data 403 on the web page 401, the user 113 can request a set of video frames that are associated with the factory production data 403, in addition to the analysis result 402 extracted for videos. FIG. 8 illustrates an example of factory production data 403. The factory production data 403 may include production data such as work shift, production type, and yield. Also, in some aspects, there may be timestamps in the factory production data 403 so the web page 401 can display the analysis result 402 and factory production data 403 synchronously. As a result, for example, it allows the user 113 to get a set of video frames when there was a low yield.

The UI server 109, in some aspects, may respond at S213 to the client computer's query at S212 by sharing a location of the video frames corresponding to the query 122d. The locations can be expressed by a URL of the set of video frames stored on the storage 104 on the edge computer 101. In this case, the UI server 109 may respond, at S213, with a URL of the requested videos stored on the edge computer 101 based on the result of the network proximity assessment at S209, being "Same network group." This URL may be embedded in an updated version of the web page 401, as a source of a video in a video area 405. Therefore, the client computer 111 may further request a set of video frames from the edge computer 101 at S214. The edge computer 101, may transmit at S215 the requested set of video frames. For example, the edge computer 101 may transmit at S215 the requested set of video frames to the client computer 114 via a route (e.g., route 126) that includes the internet 118 but does not include the cloud 107 (of the video cache 110).

If the client computer 114, which is connected to a different network 115, requests a video, by a user 116, the client computer 114 may not able to download video frames from the edge computer 101 through a route without use of the internet 118. In such cases, the result of the network proximity assessment, at S209, may be "Different network group." The query at S301 (119a) to the UI server 109 may include the result of network proximity assessment as "Different network group." The UI server 109, in some aspects, may check if the requested set of video frames are already stored in the video cache 110 on the cloud 107. If the set of video frames are not available in the video cache 110, the UI server 109 may transmit a request, at S302, to the edge computer 101 for the requested set of video frames. The request, at S302, may include a request to the video cache 110 on the cloud 107 to activate the data transfer capability 106 (S302) via an order for activation 125. In some aspects, the data transfer capability 106 may upload extended sets of video frames, such as video frames captured by other cameras monitoring the same target process 102 or sets of video frames corresponding to events having similar KPIs as the requested event's KPI.

At S303, the edge computer 101 may transmit, and the UI server 109 (or the video cache 110) may receive, the requested video frames. The UI server 109 may store the requested video frames on the video cache 110. Here the video cache 110 will assign a different, cloud-based URL for the video frames on the cloud 107. FIG. 9 illustrates a set of data stored in the storage for analysis result 108 after adding the cloud-based URL. For example, after storing the requested video frames, the UI server 109, or the video cache 110, may add the cloud-based URL to the initial sets of data received from the signal analysis component 105 (e.g., the data set illustrated in FIG. 7) stored in the storage for analysis result 108, as shown in FIG. 9.

At S304, the UI server 109 may respond to the client computer's query at S301 (119a) by sharing a location of the video frames corresponding to the query (119b). The locations can be expressed by a URL (e.g., the cloud-based URL) of video frames corresponding to the video fames received at S303 and stored to the video cache 110 on the cloud 107. For example, the UI server 109 returns the cloud-based URL of the requested videos stored on the cloud 107 (e.g., in video cache 110), because the result of the network proximity assessment was "Different network group." This URL may be embedded in an updated version of the web page 401, e.g., associated with a video area 405.

At S305, the client computer 114 may then request a set of video frames from the cloud 107 (e.g., the video cache 110). The cloud 107 (or the video cache 110), at S306, may then provide, and the client computer 114 may receive, the requested video frames. The client computer 114 may then display the requested video frames in the video area 405.

Figure 10:
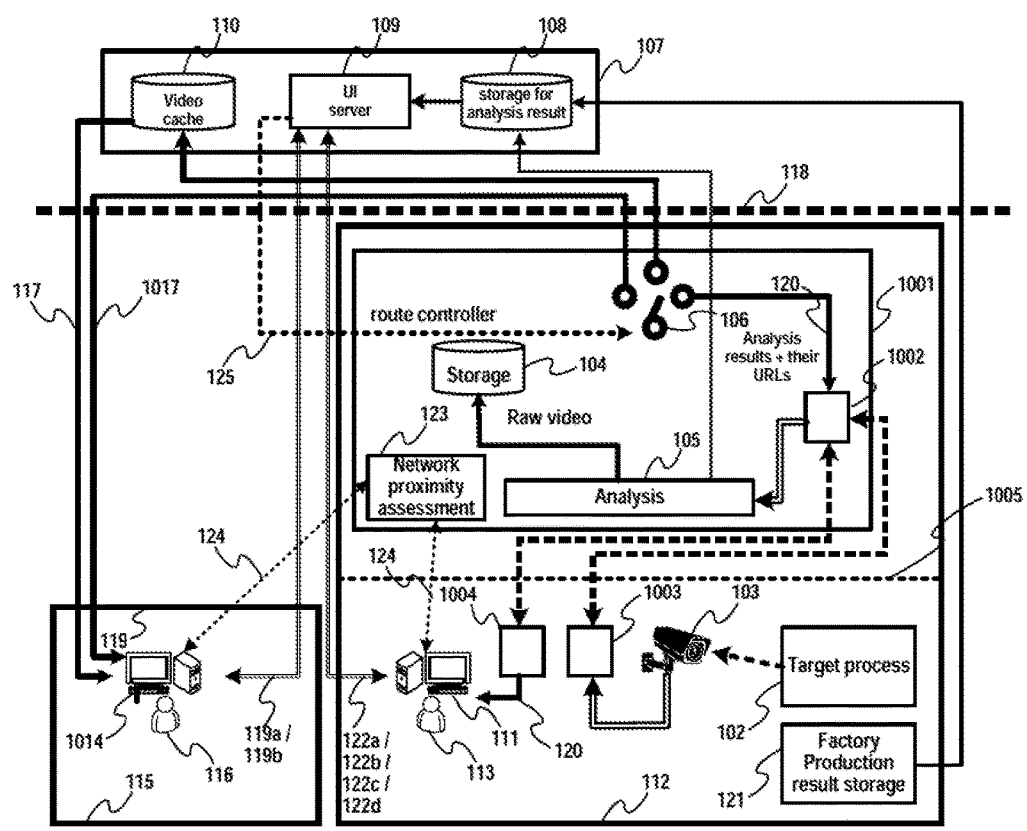
FIG. 10 illustrates a Multi-access Edge Computing resource (MEC) in accordance with some aspects of the invention.

FIG. 10 illustrates a Multi-access Edge Computing resource (MEC) 1001 in accordance with some aspects of the invention. The MEC 1001 may be located on the same premises as the target process 102 or at a location outside the premises, but physically close to the premises. The MEC 1001's network may also belong to the network 112 over a fifth-generation mobile user network (5G). Communications over 5G network done by a 5G modem 1002 attached to the MEC 1001, another 5G modem 1003 attached to the camera 103, and another 5G modem 1004 attached to the client computer 111. Cellular networks require infrastructures such as base stations and baseband switches that can be placed in the same premises as the target process 102, or even outside of factory's premises. However, in FIG. 10, those infrastructures are omitted and illustrated as just a 5G infrastructure 1005.

In some aspects, the MEC 1001's network and a factory's local network may be different. However, as long as there is a route on which a client can receive a video from the MEC 1001, they can be considered as "the same network group" if communications meet the proximity criteria or are not communicated through a route over the internet 118. Therefore, even in aspects utilizing MEC 1001, this system may utilize the concept of "network group" for video data transmission that enables reducing the amount of data transferred from/to the cloud 107 through a route over the internet 118.

In this system configuration with the MEC 1001, the UI server 109 uses the same microprogram that lets the client computer 111 or 1014 transmit a network proximity check packet 124 to the network proximity assessment block 123 in the MEC 1001 (corresponding to edge computer 101 of FIG. 1). The microprogram may further allow the client computer 111 or 1014 to receive a reply from the network proximity assessment block 123 on the MEC 1001, to assess if the client computer 111 or 1014 belongs to the same network group as the MEC 1001. In some aspects, the packet is a simple http message to check if there is a firewall rule that denies http communications. The client computer 1014 may be in a different network 115 (e.g., a different physical network) and a same, or different, virtual network, but may still be in a same network group or may be in a different network group based on the proximity criteria. For example, if the client computer 1014 is determined to be in a same network group as the MEC 1001, requested data may be transmitted to the client computing device 1014 via route 1017 via the internet 118. This brings advantages such as; an automatic identification of a client's network and adoption to a dynamic change of the network configuration, especially for a mobile terminal such smartphones utilizing multiple mobile network; 5G, typical cellular network, and WiFi, that might be switched dynamically. Accordingly, it may lead to increasing accessibility and reducing the cost.

Figure 11:
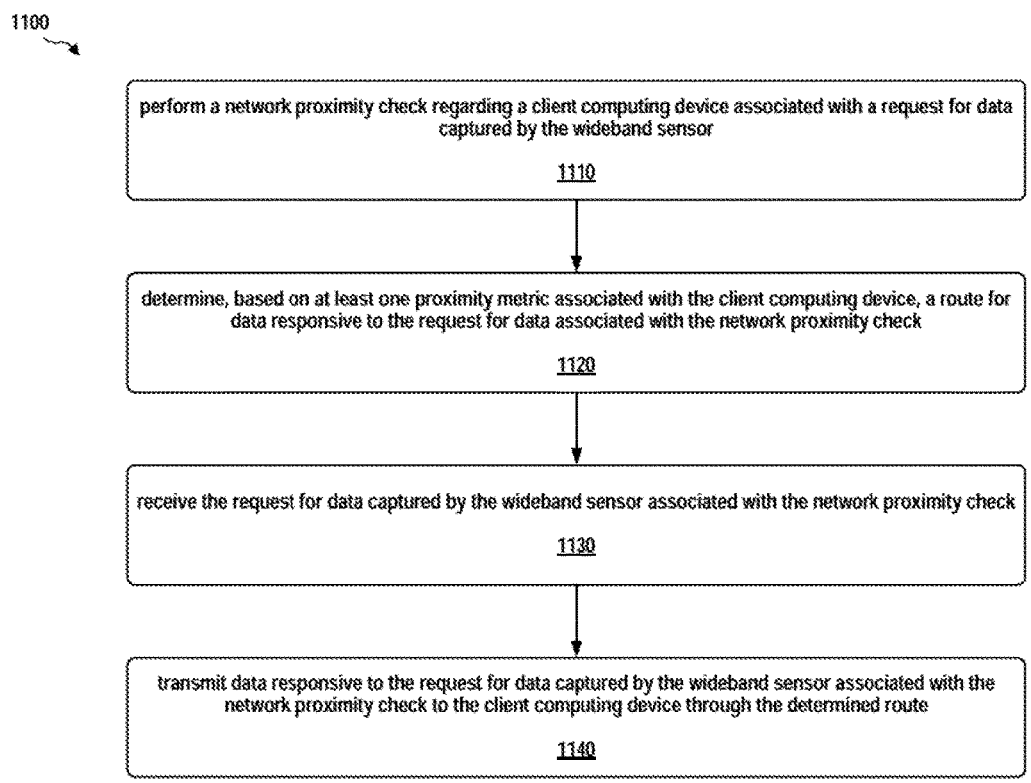
FIG. 11 is a flowchart for a method of providing data to a client computing device from an edge computing device.

FIG. 11 is a flowchart for a method of providing data to a client computing device from an edge computing device. The method may be performed by an edge computing device (e.g., edge computer 101, MEC 1001). At 1110, the method may include performing a network proximity check associated with a request for data captured by a wideband sensor.

The network proximity check may be performed (e.g., transmitted by the client computing device and received at the edge computing device or the reverse) based on one or more of a configured period, a timeout parameter, or a detected event. The network proximity check, in some aspects, may be a packet that includes a simple http message to check if there is a firewall rule that denies http communications. The network proximity check, in some aspects, may include multiple packets with multiple TTL values so the program can count a number of hops between the edge computing device and the client computing device. The packet may also be a pair of round-trip packets that measures a turn-around-time between the edge computing device and the client computing device. All these messages may be created to check if the two networks belong to the same network group (e.g., meet a set of proximity criteria), regardless of network configurations. For example, referring to FIGS. 1, 2, 3, and 10, the edge computer 101 or the MEC 1001 may receive, at S208, network proximity check packet 124 from one of client computer 111 or client computer 114.

At 1120, the method may include determining, based on at least one proximity metric associated with the client computing device, a route for data responsive to the request for data associated with the network proximity check. The route, in some aspects, may be one of a route including the cloud storage or a route that does not include the cloud storage as described in relation to FIGS. 1-3. In some aspects, the at least one proximity metric includes one or more of a latency of a communication between the edge computing device and the client computing device or a number of hops between the edge computing device and the client computing device. For example, when a value associated with the at least one proximity metric is above a threshold value, the determined route may include the cloud storage and when the value associated with the at least one proximity metric is below the threshold value the determined route may not include the cloud storage. In some aspects, determining the route for the data responsive to the request for data associated with the network proximity check may further be based on a bandwidth available for the communication between the edge computing device and the client computing device. For example, if the bandwidth available for the communication between the edge computing device and the client computing device is below a threshold value, the determined route may include the cloud storage. For example, referring to FIGS. 1, 2, 3, and 10, the edge computer 101 or the MEC 1001 may determine, in response to the network proximity check packet received at S208, a route for data responsive to the request for data associated with the network proximity check packet based on whether a client computer (e.g., one of client computers 111 or 114) is in a same "network group."

At 1130, the edge computing device may receive the request for data captured by the wideband sensor associated with the network proximity check. The request for the data, in some aspects, may be received from a client computing device when the client computing device is in a same network group (e.g., when a set of proximity criteria is met and/or the route for data responsive to the request for data associated with the network proximity check determined at 1120 does not include the cloud storage). In some aspects, the request for the data may be received from a cloud device (e.g., a UI server) when the client computing device is not in a same network group (e.g., when a set of proximity criteria is not met and/or the route for data responsive to the request for data associated with the network proximity check determined at 1120 includes the cloud storage). For example, referring to FIGS. 1, 2, 3, and 10, the edge computer 101 or the MEC 1001 may receive a request for video frames at S214 or at S302.

Finally, at 1140, the edge computing device may transmit the data responsive to the request for data captured by the wideband sensor associated with the network proximity check to the client computing device through the determined route. For example, if the route determined at 1120 includes the cloud storage, the edge computing device may transmit the data responsive to the request through the cloud storage. In some aspects, if the route determined at 1120 does not include the cloud storage, the edge computing device may transmit the data responsive to the request to the client computing device to the client computing device via a route not including the cloud storage. For example, referring to FIGS. 1, 2, 3, and 10, the edge computer 101 or the MEC 1001 may transmit a requested set of video frames, at S215 or S303, to a client computer 111 via a route 117 including the cloud storage 107 (e.g., video cache 110) or a route 1017 not including the cloud storage 107.

Figure 12:
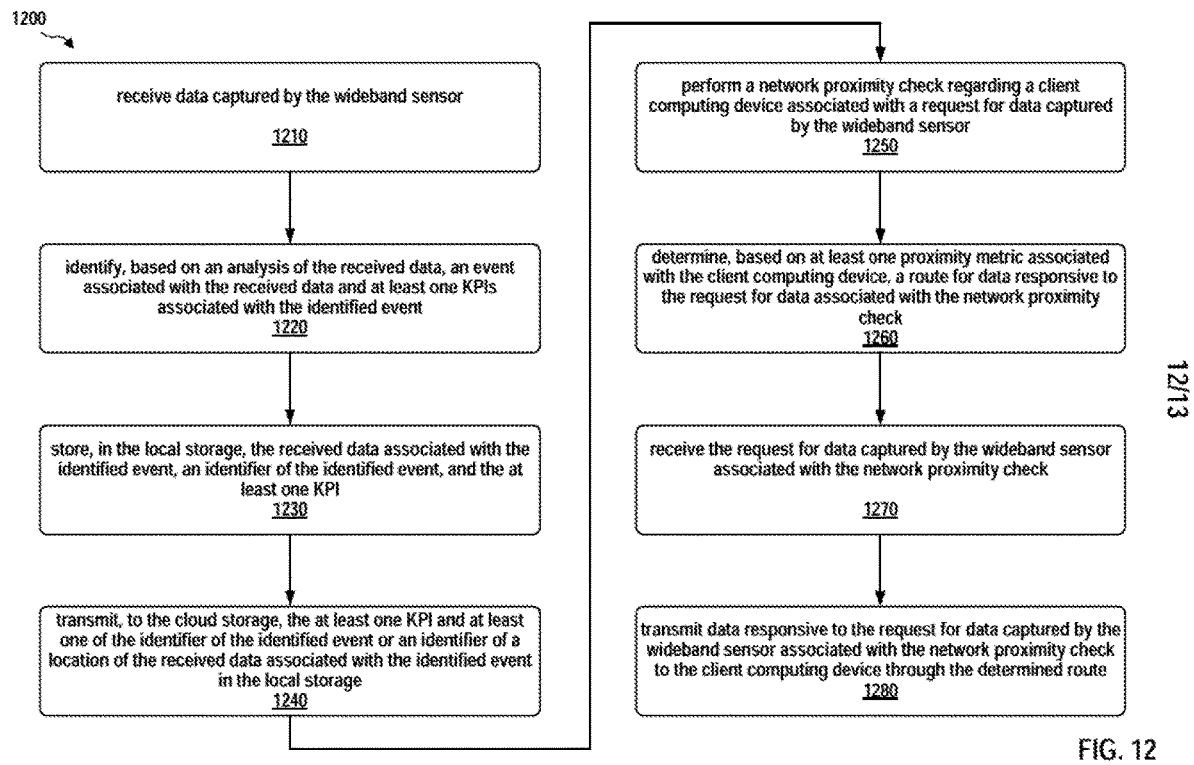
FIG. 12 is a flowchart for a method of providing data to a client computing device from an edge computing device.

FIG. 12 is a flowchart for a method of providing data to a client computing device from an edge computing device. The method may be performed by an edge computing device (e.g., edge computer 101, MEC 1001). At 1210, the method may include receiving data captured by the wideband sensor. The captured data may be a set of images (e.g., 2D data such as a time lapse or video data) or point cloud data (e.g., 3D data from one or more LiDAR devices). For example, referring to FIGS. 1, 2, 3, 5, 6, and 10, the edge computer 101 or the MEC 1001 (e.g., a signal analysis component 105) may receive video, at S201, from a camera 103 or 3D data captured by 3D scanners 601*a*-601*c*.

At 1220, the method may include identifying, based on an analysis of the received data, an event associated with the received data and at least one KPI associated with the identified event. In some aspects, the identified event may be a particular cycle of a process and the at least one KPI may be a cycle time associated with the particular cycle of the process. For example, referring to FIGS. 1, 2, 3, 5, 6, 7, and 10, the edge computer 101 or the MEC 1001 (e.g., a signal analysis component 105) may analyze, at S202, the data received at S201 to identify events 701-703 (e.g., cycles) and at least one KPI (e.g., a cycle time) using one of the processes of FIG. 5 or 6.

At 1230, the method may include storing, in the local storage, the received data associated with the identified event, an identifier of the identified event, and the at least one KPI. The received data, in some aspects, may be stored in a different data structure than the identifier and the at least one KPI. The received data may be stored in the local storage before the analysis performed at 1220 and may be associated with the identifier of the identified event and the at least one KPI after the analysis performed at 1220. For example, referring to FIGS. 1, 7, and 10, the edge computer 101 or the MEC 1001 may store the video data received at S201 and the result of the analysis performed by the signal analysis component 105 in the storage 104 (e.g., a local storage).

At 1240, the method may include transmitting, to the cloud storage, the at least one KPI and at least one of the identifier of the identified event or an identifier of a location of the received data associated with the identified event in the local storage. In some aspects, the edge computing device may transmit the at least one KPI, an identifier of the identified event, and an identifier of a location of the received data associated with the identified event in the local storage for each of a plurality of events. The cloud storage may make the transmitted information available to a client computing device for analysis. For example, referring to FIGS. 1-4, 7, and 10, the edge computer 101 or the MEC 1001 may transmit, at S203, the data illustrated in FIG. 7 to the cloud 107 (e.g., to storage for analysis result 108) for the cloud 107 (e.g., the UI server 109) to provide to the client computer 111, 114, or 1014 as part of a web page 401.

At 1250, the method may include performing a network proximity check associated with a request for data captured by a wideband sensor. The network proximity check may be performed (e.g., transmitted by the client computing device and received at the edge computing device or the reverse) based on one or more of a configured period, a timeout parameter, or a detected event. The network proximity check, in some aspects, may be a packet that includes a simple http message to check if there is a firewall rule that denies http communications. The network proximity check, in some aspects, may include multiple packets with multiple TTL values so the program can count a number of hops between the edge computing device and the client computing device. The packet may also be a pair of round-trip packets that measures a turn-around-time between the edge computing device and the client computing device. All these messages may be created to check if the two networks belong to the same network group (e.g., meet a set of proximity criteria), regardless of network configurations. For example, referring to FIGS. 1, 2, 3, and 10, the edge computer 101 or the MEC 1001 may receive, at S208, network proximity check packet 124 from one of client computers 111, 114, or 1014.

At 1260, the method may include determining, based on at least one proximity metric associated with the client computing device, a route for data responsive to the request for data associated with the network proximity check. The route, in some aspects, may be one of a route including the cloud storage or a route that does not include the cloud storage as described in relation to FIGS. 1-3. In some aspects, the at least one proximity metric includes one or more of a latency of a communication between the edge computing device and the client computing device or a number of hops between the edge computing device and the client computing device. For example, when a value associated with the at least one proximity metric is above a threshold value, the determined route may include the cloud storage and when the value associated with the at least one proximity metric is below the threshold value the determined route may not include the cloud storage. In some aspects, determining the route for the data responsive to the request for data associated with the network proximity check may further be based on a bandwidth available for the communication between the edge computing device and the client computing device. For example, if the bandwidth available for the communication between the edge computing device and the client computing device is below a threshold value, the determined route may include the cloud storage. For example, referring to FIGS. 1, 2, 3, and 10, the edge computer 101 or the MEC 1001 may determine, in response to the network proximity check packet received at S208, a route for data responsive to the request for data associated with the network proximity check packet based on whether a client computer (e.g., one of client computers 111, 114, or 1014) is in a same "network group."

At 1270, the edge computing device may receive the request for data captured by the wideband sensor associated with the network proximity check. The request for the data, in some aspects, may be received from a client computing device when the client computing device is in a same network group (e.g., when a set of proximity criteria is met and/or the route for data responsive to the request for data associated with the network proximity check determined at 1220 does not include the cloud storage). In some aspects, the request for the data may be received from a cloud device (e.g., a UI server) when the client computing device is not in a same network group (e.g., when a set of proximity criteria is not met and/or the route for data responsive to the request for data associated with the network proximity check determined at 1220 includes the cloud storage). For example, referring to FIGS. 1, 2, 3, and 10, the edge computer 101 or the MEC 1001 may receive a request for video frames at S214 or at S302.

Finally, at 1280, the edge computing device may transmit the data responsive to the request for data captured by the wideband sensor associated with the network proximity check to the client computing device through the determined route. For example, if the route determined at 1120 includes the cloud storage, the edge computing device may transmit the data responsive to the request through the cloud storage. In some aspects, if the route determined at 1120 does not include the cloud storage, the edge computing device may transmit the data responsive to the request to the client computing device to the client computing device via a route not including the cloud storage. For example, referring to FIGS. 1, 2, 3, and 10, the edge computer 101 or the MEC 1001 may transmit a requested set of video frames, at S215 or S303, to a client computer 111 via a route 117 including the cloud storage 107 (e.g., video cache 110) or a route 1017 not including the cloud storage 107.

For the client computing device, the process of FIG. 12 may include receiving information relating to a plurality of KPIs associated with a plurality of identified events from the cloud storage, (2) transmitting a network proximity check request to the edge computing device, (3) transmitting the request for data captured by the wideband sensor, wherein the request for data captured by the wideband sensor is associated with at least one of the plurality of identified events from the cloud storage, (4) receiving an indication of a location of the received data associated with the at least one of the plurality of identified events, (5) transmitting a request for the data stored at the indicated location, and (6) receiving the requested data from the indicated location. In some aspects, the indicated location is a location in the cloud storage, and the request for data captured by the wideband sensor is received, at the edge computing device at 1130 or 1270, from the cloud storage and the client computing device receives the requested data from the cloud. In some aspects, the indicated location is a location in the local storage, and the request for data captured by the wideband sensor is received, at the edge computing device at 1130 or 1270, from the client computing device and the client computing device receives the requested data from the local storage.

By applying the invention disclosed above, the video analysis system may reduce the amount of data transferred to a cloud resource through a route over the internet if a client computer belongs to the same network group as an edge computer. More specifically, video frames within the same network group, in some aspects, may not use the internet connection at all, while giving clients belonging to a different network group access to videos. Since network configurations are getting increasingly complicated and dynamic, the network proximity assessment for an automatic network proximity identification may provide increased accessibility while reducing a cost.

Figure 13:
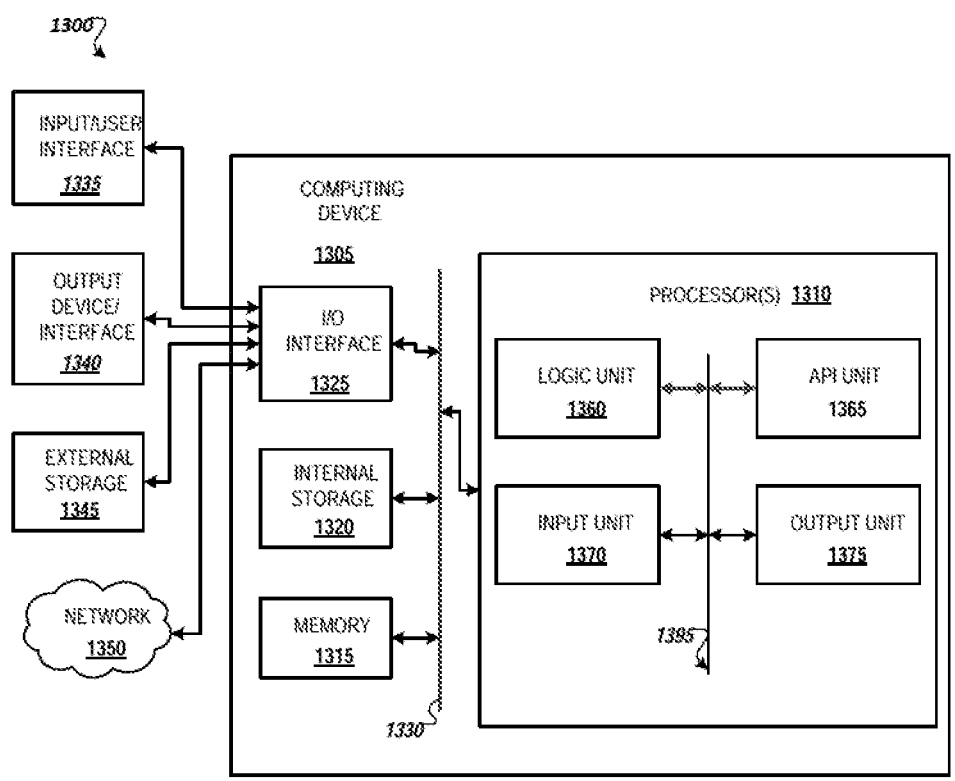
FIG. 13 illustrates an example computing environment with an example computer device suitable for use in some example implementations.

FIG. 13 illustrates an example computing environment with an example computer device suitable for use in some example implementations. Computer device 1305 in computing environment 1300 can include one or more processing units, cores, or processors 1310, memory 1315 (e.g., RAM, ROM, and/or the like), internal storage 1320 (e.g., magnetic, optical, solid-state storage, and/or organic), and/or IO interface 1325, any of which can be coupled on a communication mechanism or bus 1330 for communicating information or embedded in the computer device 1305. IO interface 1325 is also configured to receive images from cameras or provide images to projectors or displays, depending on the desired implementation.

Computer device 1305 can be communicatively coupled to input/user interface 1335 and output device/interface 1340. Either one or both of the input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via TO interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

IO interface 1325 can include but is not limited to, wired and/or wireless interfaces using any communication or TO protocols or standards (e.g., Ethernet, 1302.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided. Processor(s) 1310 can be in the form of hardware processors such as central processing units (CPUs) or in a combination of hardware and software units.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, the input unit 1370, the output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide an output based on the calculations described in example implementations.

Processor(s) 1310 can be configured to perform a network proximity check regarding a client computing device associated with a request for data captured by the wideband sensor. The processor(s) 1310 may also be configured to determine, based on at least one proximity metric associated with the client computing device, a route for data responsive to the request for data associated with the network proximity check, wherein the route is one of a route including the cloud storage or a route that does not include the cloud storage. The processor(s) 1310 may further be configured to receive the request for data captured by the wideband sensor associated with the network proximity check. The processor(s) 1310 may further be configured to transmit the data responsive to the request for data captured by the wideband sensor associated with the network proximity check to the client computing device through the determined route. The processor(s) 1310 may also be configured to receive data captured by the wideband sensor. The processor(s) 1310 may also be configured to identify, based on an analysis of the received data, an event associated with the received data and at least one KPI associated with the identified event. The processor(s) 1310 may also be configured to store, in the local storage, the received data associated with the identified event, an identifier of the identified event, and the at least one KPI. The processor(s) 1310 may further be configured to transmit, to the cloud storage, the at least one KPI and at least one of the identifier of the identified event or an identifier of a location of the received data associated with the identified event in the local storage.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed:

1. A method for providing data to a client computing device from an edge computing device of a system comprising the edge computing device communicatively coupled with a local storage, a wideband sensor, the client computing device, and a cloud storage, the method comprising:
   performing a network proximity check regarding the client computing device associated with a request for data captured by the wideband sensor;
   determining, based on at least one proximity metric associated with the client computing device, a route for data responsive to the request for data associated with the network proximity check, wherein the route is one of a route including the cloud storage or a route that does not include the cloud storage;
   receiving the request for data captured by the wideband sensor associated with the network proximity check;
   transmitting the data responsive to the request for data captured by the wideband sensor associated with the network proximity check to the client computing device through the determined route;
   receiving the data captured by the wideband sensor;
   identifying, based on an analysis of the received data, an event associated with the received least one key performance indicators (KPI) associated with the identified event;
   storing, in the local storage, the received data associated with the identified event, an identifier of the identified event, and the at least one KPI; and
   transmitting, to the cloud storage, the at least one KPI, at least one of the identifier of the identified event, and an identifier of a location of the received data associated with the identified event in the local storage.

2. The method of claim 1, wherein the at least one proximity metric comprises one or more of a latency of a communication between the edge computing device and the client computing device or a number of hops between the edge computing device and the client computing device, wherein when a value associated with the at least one proximity metric is above a threshold value the determined route includes the cloud storage and when the value associated with the at least one proximity metric is below the threshold value the determined route does not include the cloud storage.

3. The method of claim 2, wherein determining the route for the data responsive to the request for data associated with the network proximity check is further based on a bandwidth available for the communication between the edge computing device and the client computing device, wherein if the bandwidth available for the communication between the edge computing device and the client computing device is below a threshold value the determined route includes the cloud storage.

4. The method of claim 1, wherein the network proximity check is performed based on one or more of a configured period, a timeout parameter, or a detected event.

5. The method of claim 1, wherein the identified event is a particular cycle of a process and the at least one KPI is a cycle time associated with the particular cycle of the process.

6. The method of claim 1, wherein the client computing device (1) receives information relating to a plurality of KPIs associated with a plurality of identified events from the cloud storage, (2) transmits the request for data captured by the wideband sensor, wherein the request for data captured by the wideband sensor is associated with at least one of the plurality of identified events from the cloud storage, and (3) receives an indication of a location of the received data associated with the at least one of the plurality of identified events.

7. The method of claim 6, wherein the indicated location is a location in the cloud storage, and the request for data captured by the wideband sensor is received from the cloud storage.

8. The method of claim 6, wherein the indicated location is a location in the local storage and the request for data captured by the wideband sensor is received from the client computing device and comprises the indicated location.

9. The method of claim 1, wherein the edge computing device and the client computing device are in a same virtual network.

10. An edge computing device for providing data to a client computing device from the edge computing device of a system comprising the edge computing device communicatively coupled with a local storage, a wideband sensor, the client computing device, and a cloud storage, the edge computing device comprising:
   a memory; and
   at least one hardware processor coupled to the memory and configured to:
   perform a network proximity check regarding the client computing device associated with a request for data captured by the wideband sensor;
   determine, based on at least one proximity metric associated with the client computing device, a route for data responsive to the request for data associated with the network proximity check, wherein the route is one of a route including the cloud storage or a route that does not include the cloud storage;
   receive the request for data captured by the wideband sensor associated with the network proximity check;
   transmit the data responsive to the request for data captured by the wideband sensor associated with the network proximity check to the client computing device through the determined route;
   receiving the data captured by the wideband sensor;
   identify, based on an analysis of the received data, an event associated with the received least one key performance indicators (KPI) associated with the identified event;
   store, in the local storage, the received data associated with the identified event, an identifier of the identified event, and the at least one KPI; and
   transmit, to the cloud storage, the at least one KPI, at least one of the identifier of the identified event, and an identifier of a location of the received data associated with the identified event in the local storage.

11. The edge computing device of claim 10, wherein the at least one proximity metric comprises one or more of a latency of a communication between the edge computing device and the client computing device or a number of hops between the edge computing device and the client computing device, wherein when a value associated with the at least one proximity metric is above a threshold value the determined route includes the cloud storage and when the value associated with the at least one proximity metric is below the threshold value the determined route does not include the cloud storage.

12. The edge computing device of claim 11, wherein determining the route for the data responsive to the request for data associated with the network proximity check is further based on a bandwidth available for the communication between the edge computing device and the client computing device, wherein if the bandwidth available for the communication between the edge computing device and the client computing device is below a threshold value the determined route includes the cloud storage.

13. The edge computing device of claim 10, wherein the network proximity check is performed based on one or more of a configured period, a timeout parameter, or a detected event.

14. The edge computing device of claim 10, wherein the identified event is a particular cycle of a process and the at least one KPI is a cycle time associated with the particular cycle of the process.

15. The edge computing device of claim 10, wherein the client computing device (1) receives information relating to a plurality of KPIs associated with a plurality of identified events from the cloud storage, (2) transmits the request for data captured by the wideband sensor, wherein the request for data captured by the wideband sensor is associated with at least one of the plurality of identified events from the cloud storage, and (3) receives an indication of a location of the received data associated with the at least one of the plurality of identified events.

16. The edge computing device of claim 15, wherein the indicated location is a location in the cloud storage, and the request for data captured by the wideband sensor is received from the cloud storage.

17. The edge computing device of claim 15, wherein the indicated location is a location in the local storage and the request for data captured by the wideband sensor is received from the client computing device and comprises the indicated location.

18. The edge computing device of claim 10, wherein the edge computing device and the client computing device are in a same virtual network.

* * * * *